(12) United States Patent
Hadar et al.

(10) Patent No.: US 9,952,958 B2
(45) Date of Patent: *Apr. 24, 2018

(54) USING PATTERNS AND ANTI-PATTERNS TO IMPROVE SYSTEM PERFORMANCE

(71) Applicant: CA, Inc., New York, NY (US)

(72) Inventors: Eitan Hadar, Nesher (IL); Kieron John James Connelly, Brighton (GB); Olga Lagunova, Butler, PA (US); Peter Anthony Lazzaro, Great River, NY (US)

(73) Assignee: CA, Inc., New York, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/087,771

(22) Filed: Mar. 31, 2016

(65) Prior Publication Data

US 2016/0217054 A1 Jul. 28, 2016

Related U.S. Application Data

(63) Continuation of application No. 12/767,357, filed on Apr. 26, 2010, now Pat. No. 9,336,331.

(51) Int. Cl.
*G06F 9/44* (2018.01)
*G06F 11/34* (2006.01)
(Continued)

(52) U.S. Cl.
CPC ............ *G06F 11/3409* (2013.01); *G06F 8/36* (2013.01); *G06F 8/77* (2013.01); *G06F 11/008* (2013.01);
(Continued)

(58) Field of Classification Search
CPC .. G06F 11/008; G06F 11/302; G06F 11/3037; G06F 11/3409; G06F 11/30864;
(Continued)

(56) References Cited

U.S. PATENT DOCUMENTS 6,249,886 B1 * 6/2001 Kalkunte ............ G06F 11/3414
714/39
6,574,605 B1 6/2003 Sanders et al.
(Continued)

OTHER PUBLICATIONS

Marco Crasso et al., "EETuning Expert: A software assistant for improving Java Enterprise Edition application performance", [Online], 2009, pp. 11718-11729, [Retrieved from Interent on Oct. 27, 2017], <https://ac.els-cdn.com/S0957417409003662/1-s2.0-S0957417409003662-main.pdf>.*
(Continued)

*Primary Examiner* — Ziaul A Chowdhury
(74) *Attorney, Agent, or Firm* — Gilliam IP PLLC

(57) ABSTRACT

Performance of a computer system is measured based, at least in part, on a performance metric. In response to determining that the computer system is experiencing a performance issue based on measuring the performance, the performance metric is matched with an anti-pattern to identify a performance issue, wherein the anti-pattern defines an incorrect solution to a defined problem occurring in the computer system. Also, a pattern repository is queried to identify a pattern that defines a correct solution to the defined problem based, at least in part, on the match between the performance metric and the anti-pattern. In response to identifying the pattern, implementing the pattern in the computer system to improve the performance.

20 Claims, 8 Drawing Sheets

(51) Int. Cl.
  *G06F 17/30* (2006.01)
  *G06F 11/00* (2006.01)
  *G06F 11/30* (2006.01)
(52) U.S. Cl.
  CPC ........ *G06F 11/302* (2013.01); *G06F 11/3037* (2013.01); *G06F 17/30864* (2013.01); *G06F 17/30985* (2013.01)
(58) Field of Classification Search
  CPC ........ G06F 17/30985; G06F 8/36; G06F 8/77; G06F 17/3085; G06F 17/30864
  See application file for complete search history.

(56) References Cited

U.S. PATENT DOCUMENTS

| | | |
|---|---|---|
| 6,681,344 B1 | 1/2004 | Andrew |
| 6,742,141 B1 | 5/2004 | Miller |
| 6,851,105 B1 | 2/2005 | Coad et al. |
| 7,065,624 B1 | 6/2006 | Zahavi |
| 7,213,231 B1 | 5/2007 | Bandhole et al. |
| 7,237,023 B2 | 6/2007 | Menard et al. |
| 7,243,265 B1* | 7/2007 | Wookey .............. G06F 11/2252 714/37 |
| 7,363,543 B2 | 4/2008 | Peebles et al. |
| 7,424,530 B2 | 9/2008 | Chagoly et al. |
| 7,627,861 B2 | 12/2009 | Smith et al. |
| 7,730,364 B2 | 6/2010 | Chang et al. |
| 7,734,451 B2 | 6/2010 | MacArthur et al. |
| 7,757,214 B1 | 7/2010 | Parlczak et al. |
| 7,769,562 B2 | 8/2010 | Vaidyanathan et al. |
| 7,818,723 B2 | 10/2010 | Alikacem et al. |
| 8,136,090 B2 | 3/2012 | Boss et al. |
| 8,225,221 B2 | 7/2012 | Beran et al. |
| 9,210,056 B1* | 12/2015 | Choudhary ....... G06F 17/30864 |
| 9,275,148 B1* | 3/2016 | Elassaad .......... G06F 17/30864 |
| 2003/0005112 A1 | 1/2003 | Krautkremer |
| 2004/0034698 A1 | 2/2004 | Abu-Husein et al. |
| 2004/0102925 A1* | 5/2004 | Giffords ............. G06F 11/3409 702/182 |
| 2004/0230964 A1* | 11/2004 | Waugh ....................... G06F 8/77 717/168 |
| 2005/0086246 A1 | 4/2005 | Wood et al. |
| 2005/0166193 A1 | 7/2005 | Smith et al. |
| 2005/0235248 A1 | 10/2005 | Victoria et al. |
| 2006/0053422 A1* | 3/2006 | Alikacem ............... G06F 9/524 718/100 |
| 2006/0161884 A1 | 7/2006 | Lubrecht et al. |
| 2006/0225032 A1 | 10/2006 | Klerk et al. |
| 2006/0253840 A1* | 11/2006 | Cruickshank ....... G06F 11/3447 717/127 |
| 2007/0050683 A1* | 3/2007 | Attinella ............... G06F 11/302 714/47.1 |
| 2007/0083500 A1 | 4/2007 | Zibitsker |
| 2007/0156420 A1 | 7/2007 | Meier et al. |
| 2007/0157156 A1 | 7/2007 | Meier et al. |
| 2007/0185990 A1* | 8/2007 | Ono .................... G06F 11/3409 709/224 |
| 2007/0277150 A1* | 11/2007 | Oouchi .................... G06F 8/36 717/109 |
| 2008/0126881 A1* | 5/2008 | Bruckhaus ............ G06F 11/008 714/47.2 |
| 2008/0134135 A1 | 6/2008 | Elaasar |
| 2009/0031176 A1 | 1/2009 | Ide et al. |
| 2009/0193064 A1 | 7/2009 | Chen et al. |
| 2010/0005444 A1* | 1/2010 | McPeak .................... G06F 8/36 717/100 |
| 2010/0145755 A1 | 6/2010 | Narkilahti |
| 2011/0022551 A1 | 1/2011 | Mark |
| 2011/0047208 A1* | 2/2011 | Kudou ................ G06F 11/3409 709/203 |
| 2011/0078106 A1* | 3/2011 | Luchi .................. G06F 11/3452 706/48 |
| 2011/0213738 A1 | 9/2011 | Sen et al. |
| 2011/0231828 A1* | 9/2011 | Kaulgud ................... G06F 8/77 717/131 |
| 2011/0270804 A1 | 11/2011 | Hadar et al. |
| 2011/0276836 A1* | 11/2011 | Kahana ............... G06F 11/0709 714/38.1 |
| 2015/0205695 A1* | 7/2015 | Sengupta ............ G06F 11/3409 707/688 |
| 2015/0310014 A1* | 10/2015 | Yishay .............. G06F 17/30985 707/728 |

OTHER PUBLICATIONS

Adriana E. Chis, "Automatic Detection of Memory Anti-Patterns", [Online], 2008, pp. 925-926, [Retrieved from Internet on Oct. 27, 2017], <https://pdfs.semanticscholar.org/fb4b/7df413eb87ade9191d837ce895d632a41ec9.pdf>.*

Anne Martens et al., "Performance-oriented Design Space Exploration", [Online], 2008, pp. 1-8, [Retrieved from Interent on Oct. 27, 2017], <https://pdfs.semanticscholar.org/4ccb/015275e4a31f03e6d69055df2f0cd48659fe.pdf>.*

Ioannis Stamelos, "Software project management anti-patterns", [Online], 2009, pp. 52-59, [Retrieved from Internet on Feb. 12, 2018], <https://ac.els-cdn.com/S0164121209002325/1-s2.0-S0164121209002325-main.pdf>.*

Justin Kelleher, "A Reusable Traceability Framework using Patterns", [Online] 2005, pp. 50-55, [Retrieved from Internet on Feb. 12, 2018], <http://delivery.acm.org/10.1145/1110000/1107668/p50-kelleher.pdf>.*

Tianhong Song, "Provenance-Driven Data Curation Workflow Analysis", [Online], 2015, pp. 45-50, [Retrieved from Internet on Feb. 12, 2018], <http://delivery.acm.org/10.1145/2750000/2744691/p45-song.pdf>.*

Rabia Bashir, "Anti-patterns in Open Source Software Development", [Online], 2012, pp. 23-30, [Retrieved from Internet on Feb. 12, 2018], <https://pdfs.semanticscholar.org/b8c2/663c5310f7317acc5e2a54c1482318047e5e.pdf>.*

DICTIONARY.COM, "automatic", http://dictionary.reference.com/browse/automatic, May 16, 2014, p. 1.

Hacigumus, "Anti-patterns: Integrating Distributed and Heterogeneous Data Sources in SOAs", http://ieeexplore.ieee.org/stamp/stamp.jsp?tp=&arnumber=4578306, 2008, pp. 1-2.

Kim, "Enterprise 2.0 Anti-Patterns, ROI and metrics", http://cdn.oreillystatic.com/en/assets/1/event/22/Enterprise%20Web%202_0%20Anti-Patterns,%20ROI,%20and%20Metrics%20Presentation.pdf, 2009, pp. 1-81.

Parsons, "A Framework for Detecting Performance Design and Deployment Antipatterns in Component Based Enterprise Systems", http://delivery.acm.org/10.1145/1110000/1101147/a7-parsons.pdf, 2005, pp. 1-5.

* cited by examiner

— 302

| DATABASE SERVER DB3-#23 | |
|---|---|
| NAME | ERP-BW-1 |
| DESCRIPTION | MAIN DB FOR ERP BW IN EMEA |
| # OF LICENSES | 4 |
| COST/LICENSE | 18000.00 |
| MAINT COSTS | 1200.00 |

| DATABASE SERVER | |
|---|---|
| NAME | STRING |
| DESCRIPTION | STRING |
| # OF LICENSES | NUMBER |
| COST/LICENSE | MONEY |
| MAINT COSTS | MONEY |

*FIG. 4*

USING PATTERNS AND ANTI-PATTERNS TO IMPROVE SYSTEM PERFORMANCE

RELATED APPLICATIONS

This application is a continuation application of and claims priority to U.S. patent application Ser. No. 12/767,357 filed on Apr. 26, 2010, the entirety of which is incorporated herein by reference.

BACKGROUND

In software engineering and enterprise systems, patterns refer to recommendations for designing well-known solutions to well-defined problems. Anti-Patterns are described as the symptoms, or other system properties, that indicate a bad solution, or anti-pattern, was implemented for a known problem. Such prototypical micro-architecture solutions enable copying of patterns and adaptation of particular design structures to solve recurrent problems described by the copied patterns. Also, anti-patterns enable evaluation of deployed solutions to identify problems.

Pattern and anti-pattern detection has been a difficult process. It is quite possible that there are many patterns and anti-patterns that have been implemented many times, but not identified. Without being identified, patterns and anti-patterns cannot be used to assist in system design and configuration or to identify systems having design and configuration issues before problems arise.

BRIEF DESCRIPTION OF THE DRAWINGS

Embodiments of the disclosure may be better understood by referencing the accompanying drawings.

FIG. 3 illustrates a data structure according to an example embodiment.

FIG. 4 illustrates a data structure according to an example embodiment.

FIG. 9 is a flow diagram of a method according to an example embodiment.

DESCRIPTION

Figure 1:
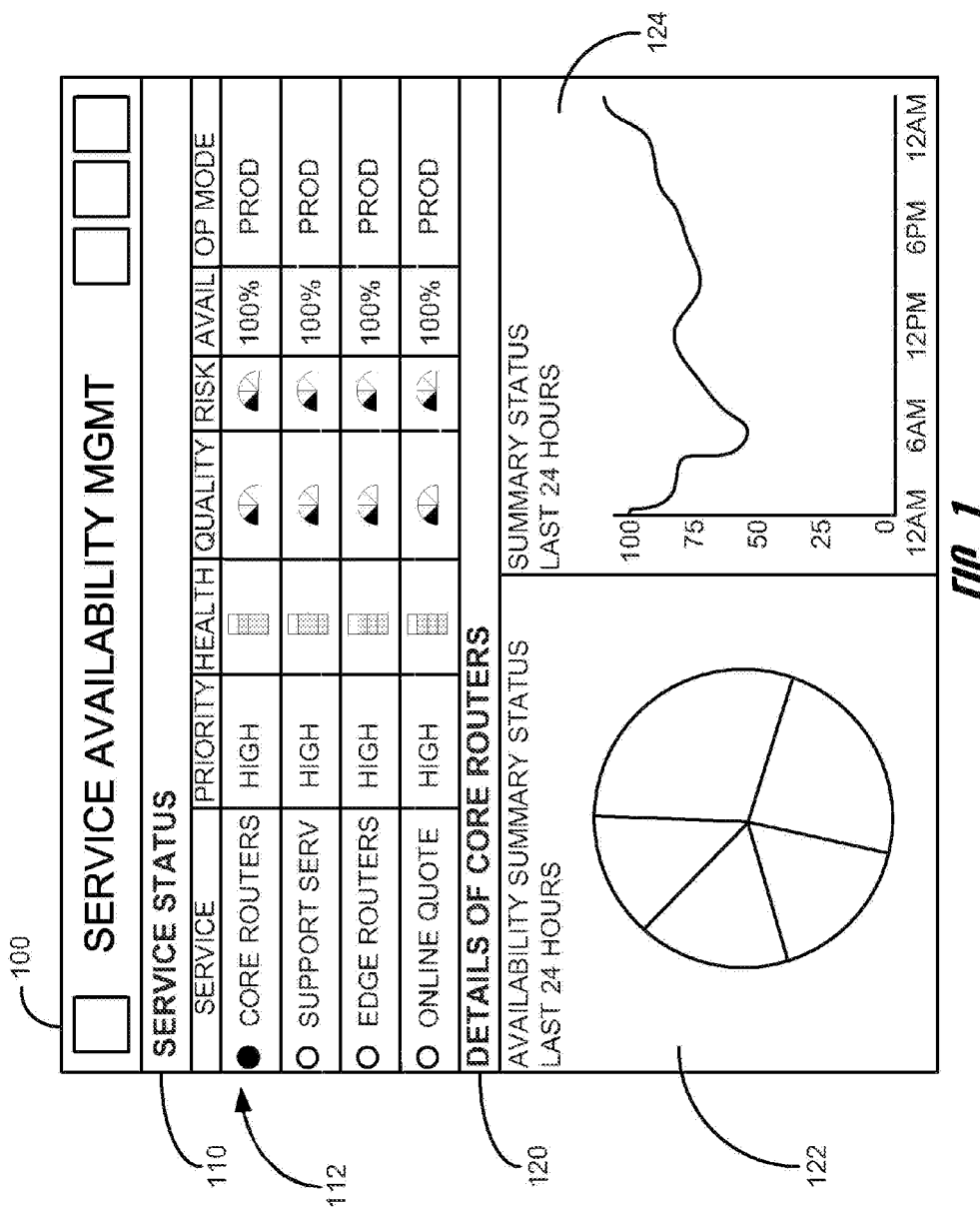
FIG. 1 is a user interface illustration according to an example embodiment.

As mentioned above, in software engineering and enterprise systems, patterns refer to recommendations for designing well-known solutions to well-defined problems. Anti-Patterns are symptoms, or other system properties, that indicate a bad solution, or anti-pattern, was implemented for a known problem. Such prototypical micro-architecture solutions enable copying of patterns and adaptation of particular design structures to solve recurrent problems described by the copied patterns. Also, anti-patterns enable evaluation of deployed solutions to identify problems that may or may not be apparent.

Patterns are therefore sophisticated tips and tricks indicating that a certain solution was implemented successfully over a set of solutions and constructed approximately the same way. Anti-patterns are the converse where the sophisticated tips and tricks indicate that a certain solution was implemented unsuccessfully over a set of solutions and constructed approximately the same way. With these definitions of patterns and anti-patterns in mind, for ease of explanation, patterns and anti-patterns are at times commonly referred to as patterns.

Information Technology (IT) design often involves combinations of IT infrastructure technology known as Configuration Items (CIs), as well as other supporting processes that collectively, based on modeled associations, construct a logical group of CIs, known as a service model. The CIs may represent elements of IT infrastructure technology such as routers, switches, data storage devices, servers, client computers, logical server programs and processes, and applications and processes that execute on server or client computers. Service models may be associated with metrics. The associate metrics that evaluate parameters of the service model to obtain indicators of quality, availability, risk, and heath levels of an underlying system, and what constituent CIs are influencing the service model. These metrics and indicators can be defined with Service Level Agreements or Objectives (SLA or SLO) and their associated operational level agreements.

A pattern, in some embodiments, is a set of CIs of a service model associated with maintained or improved service levels as measured by at least one SLA or other metric. An anti-pattern, in some embodiments, is a set of CIs of a service model associated with deteriorating or non-improving, low service levels as measured by at least one SLA or other metric. An anti-pattern may also include a set of CIs of a service model that may create future system scalability issues.

Patterns and anti-patterns are represented and stored in a pattern data structure. A pattern data structure includes data representative of CI configuration settings defining a pattern or anti-pattern. The data representative of the CI configuration settings defining a pattern or anti-pattern can be instantiated in a target computing system to implement the pattern or to detect the anti-pattern. Pattern data structures are stored typically in a pattern repository, such as on a hard disk of a computing device. To facilitate searching and identification of patterns and anti-patterns of interest, the pattern data structure may include additional data such as metadata that facilitates searching, provides data to present a visualization of the pattern or anti-pattern, provides a description of the purposes of the pattern, identifies affected configuration items, processes, and services, and other data depending on the particular embodiment. However, before a pattern or anti-pattern may be utilized to identify a possible system configuration, the pattern or anti-pattern needs to be defined.

Various embodiments described and illustrated herein include at least one of systems, methods, and software to identify, use, or share patterns and anti-patterns. Such embodiments are described below in this order, pattern and anti-pattern identification, use, and sharing. Embodiments that include pattern and anti-pattern identification operate to identify candidate patterns and anti-patterns within a deployed system and to confirm or receive confirmation that the identified candidates are indeed patterns or anti-patterns.

Embodiments that use patterns and anti-patterns operate to consume the identified patterns and anti-patterns to improve system performance. The embodiments that share patterns and anti-patterns include mechanisms whereby patterns and anti-patterns can be sent to and received from other systems.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or, other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Pattern and Anti-Pattern Detection

Pattern and anti-pattern identification is performed, in some embodiments, through evaluation of performance metric values over time in view of CI configuration settings and changes thereto. Performance metrics are typically applied on a recurring, periodic basis and record of performance metric values may be stored in a repository, such as a database. Historical CI configuration setting values may also be stored in a database with a time element indicating when the particular CI configuration settings values were active with regard to a particular system, device, or other IT resource. A process may then execute to identify potential patterns and anti-patterns by associating changes to CI configuration setting values with changes in performance metric values. When the change in a performance metric value is positive, that may indicate a potential pattern—while a negative change in the performance metric value may indicate a potential anti-pattern. Thus, IT system administrators, in some embodiments, are provided with visualization tools to view and monitor system health, quality, and risk over various periods to assist in pattern and anti-pattern identification. The user interface 100 of FIG. 1 is an example of how such visualizations may be provided.

FIG. 1 is a user interface 100 illustration according to an example embodiment. The user interface 100 is an example user interface included in some embodiments to provide visualization options to a system administrator for monitoring system performance over time. The example user interface 100 provides a view of a current service status 110 with regard to several services. When one of these listed services is selected, such as the CORE ROUTERS service 112, details 120 of the CORE ROUTERS service 112 are displayed within the user interface 100.

The service status 110 portion of the user interface 100 includes rows of data with each row representing various aspects of the health of a service operating within a system or computing environment. Note that a service is used herein to refer to a software service, a device, or group of two or more software services and devices. Each listed service in the service status portion 110 includes data identifying the service, the priority of the respective service to overall system health, and a representation of the overall health of the service. The data represented for each service is typically retrieved from a performance metric repository, such as a database, and presented in the user interface 100. The overall health of the service is typically an aggregation of performance metric values that measure various aspects of the health of the service, such as a quality of service provided, a level of risk of the service in breaching an SLA or other requirement, and an availability of the service. When a particular service is selected from the listing of services, such as the CORE ROUTERS service 112, the details of the selected service are retrieved from the performance metric repository.

The details of the selected service, such as the details 120 of the CORE ROUTERS service 112, that are presented include an availability summary status 122 over a period, such as 24 hours. Each of various availability statuses may be displayed in a pie chart or other representation capable of conveying a summary of the availability data. Some embodiments include a control for a user to select a period over which the summary is to be provided, such as the last 24 hours, the previous week or month, or other period. Some embodiments may include another summary view 124 of the same data as the availability summary status 122, but in a different form, such as a timeline. However, differing summary data with regard to the selected service may alternatively be provided.

The user interface 100 provides an example view of performance metric data that may be utilized for several purposes. One such purpose is to identify a period of interest for when a pattern or anti-pattern may be present. In such instances, the administrator may trigger the start of a process to generate a pattern or anti-pattern by providing input through the user interface 100. In other embodiments, a potential pattern or anti-pattern may be identified automatically through execution of one or more the methods described herein.

Figure 2:
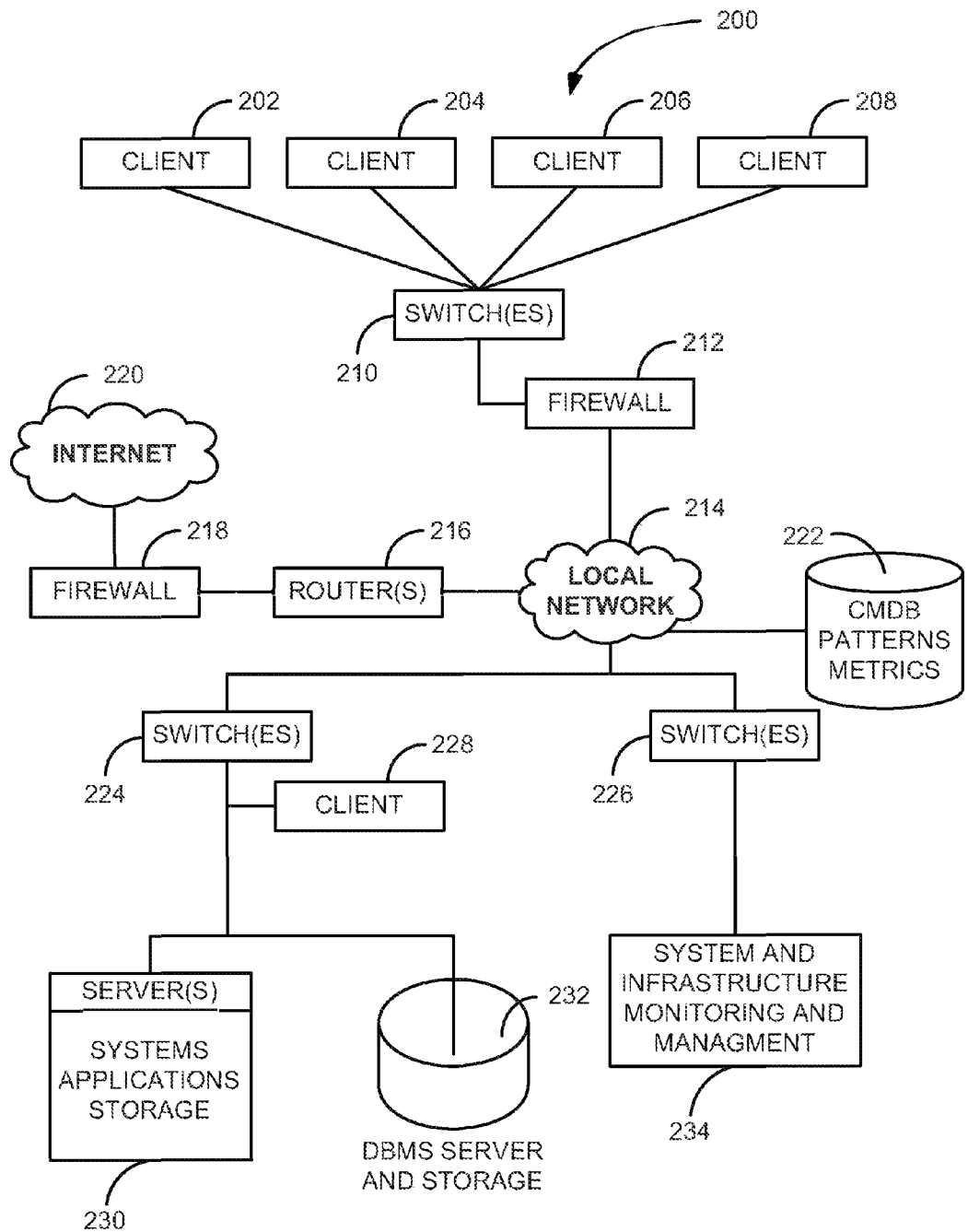
FIG. 2 is a schematic diagram of a system according to an example embodiment.

FIG. 2 is a schematic diagram of a system 200 according to an example embodiment. The system 200 is an example of a system within which patterns and anti-patterns maybe identified and implemented. The system 200 is provided merely as an example of a system in which some embodiments may be relevant. Although the system 200 is illustrated to include various IT resources, there is no requirement that all or any of these particular IT resources be present in any embodiment. Further, even if present in a particular embodiment, the CIs of these IT resources may not be relevant with regard to pattern detection, use, or sharing.

The system 200 is a networked computing environment. The network of the computing environment may include a connection to the Internet 220. In such embodiments, the remainder of the network environment is behind a firewall 218 to help shield the network environment from threats. In a typical configuration, one or more routers 216 then route traffic to a local network 214. A portion of the local network 214 may be shielded from access by some users or processes by another firewall 212. In this illustrated embodiment, the firewall 212 shields clients 202, 204, 206, 208 connected to the networked computing environment via one or more switches 210 from certain types of communications or data over the local network 214.

The local network 214 may also include connections to other IT resources, such as switches 224, 226 that provide additional connections to the local network 214. The additional connections may be utilized by additional clients 228, servers 230 such as one or more application servers hosting an enterprise application, database and storage servers 232, and a system and infrastructure monitoring and management server 234. The additional connections may also be utilized by a database 222 storing a configuration management database (CMDB), data representative of patterns and anti-patterns, performance metrics, historic performance metric data, and other IT resources.

In some embodiments, the hardware devices and processes within the computing environment, such as the firewalls 218, 212, routers 216, switches 210, 224, 226, servers 230 databases 222, 232, and other devices and processes, include an agent process that may be leverage by the system and infrastructure monitoring and management server 234. The agent processes of the hardware devices and processes may be Simple Network Management Protocol (SNMP) agent processes through which performance may be measured and configurations may be modified. In other embodiments, the agent processes of the hardware devices and processes may be proprietary agent processes, modified SNMP agent processes, or agent processes according to a different network management protocol. Yet other embodiments include two or more of such agent processes.

In some embodiments, the system and infrastructure monitoring and management server 234 performs several tasks through various processes. Such tasks may include application of performance-monitoring metrics within the networked computing environment 200 and archiving of performance metric data, presenting analytic views of performance metric data such as through the user interface 100 of FIG. 1, and providing administrator tools to modify CI settings of the various IT resources of the networked computing environment 200. Such tasks also include archiving historic CI settings, pattern and anti-pattern identification through evaluation of archived performance metric data of service models and archived CI settings of respective service models, and pattern selection and implementation to resolve performance metric violations and anti-pattern presence.

In some embodiments, the system and infrastructure monitoring and management server 234 applies performance-monitoring metrics within the networked computing environment 200. Performance-monitoring metrics, or simply metrics, measure various aspects of performance of devices and processes within the networked computing environment 200. One or more metrics may be associated with a service model and an aggregation of metric result data of the one or more metrics associated with a particular service model provides a performance measurement of the particular service model. A performance metric may be defined by an administrator to measure response time of hardware networking devices, latency in process response, availability of a device or process, available storage capacity of a data storage device, and other performance characteristics of devices and processes. A service model may include one or more aggregations of metric data to provide an overall measurement of service model health, quality, risk, availability, or other indicator depending on the embodiment.

In operation, the system and infrastructure monitoring and management server 234 retrieves metrics for a service model from a database 222 or other data storage location. The infrastructure monitoring and management server 234 then applies the metrics to obtain metric data by sending messages, such as SNMP messages, to the various devices or processes that are the subject of the retrieved metrics. The metric data is then stored, such as in the database 222. The granularity at which metric data is stored may vary between embodiments. Some embodiments may store all metric measurements while other embodiments may store a calculated value or indicator of one or more of health, quality, risk, availability, or other calculated value or indicator for a service model. In any event, when the metric data is stored, a date identifying when the metric data was generated is also stored.

Administrator tools of the infrastructure monitoring and management server 234 in some embodiments may include tools to modify CI settings of the various IT resources of the networked computing environment 200. Such tools may include client-based or web-based user interfaces, and underlying computer code, providing a view of current CI settings and allowing the administrator to modify the CI settings. Such tools may also include client-based or web-based user interfaces, and underlying computer code, to present a view of patterns available for implementation with regard to a particular service model. Such user interfaces may also allow an administrator to select a pattern for implementation. When a selection of a pattern is received for implementation, the infrastructure monitoring and management server 234 may issue commands to the IT resources of CIs included in the pattern to modify CI configuration settings. In other embodiments, the infrastructure monitoring and management server 234 may issue one or more commands to a provisioning process that operates to implement changes in the networked computing environment 200. In these and other embodiments, one or more change requests may also, or alternatively, be generated and submitted to a change request system requesting that the pattern be implemented.

However, when the infrastructure monitoring and management server 234 makes changes to CI settings, previous values of the CI configuration settings are written to a log or archive of the configuration settings along with a date when the change was made. The archive of configuration settings and the stored metric data, both including dates, may then be used to correlate changes in performance of a service model performance to changes in CI settings of the service model. For example, a process of the infrastructure monitoring and management server 234 may operate to identify performance improvements over various periods. For example, if a change in a health indicator of a service model in the stored metric data changes more than ten percent, assuming the indicator is measured by a percentage, over a 24-hour period, the configuration setting archive may then be evaluated to determine if a change was to the CI configuration settings.

In some embodiments, when a configuration change is identified, the current configuration of the service model is compared to the pervious configuration to identify the modified CI configuration settings. When the health indicator changes upward, indicating the service model is healthier, the identified CI configuration settings are stored as a candidate pattern. When the health indicator changes downward, indicating the service model is less healthy, the identified CI configuration settings are stored as a candidate anti-pattern. Candidate patterns and anti-patterns may then be presented in an interface to an administrator to receive confirmation that identified the CI configuration settings do form a pattern or anti-pattern. The administrator may also be presented with the option to add metadata to the pattern. The metadata may describe what is accomplished or resolved through implementation of the CI configuration settings of the pattern, an association to a particular hardware device type or model, an association to a software program and version, and other metadata, depending on the particular embodiment. In the instance of an anti-pattern, an administrator may add metadata associating the anti-pattern to a pattern which can be implemented to resolve the issues presented by the anti-pattern. The pattern or anti-pattern is then typically stored to the database 222 or other data storage location.

In some embodiments, when the infrastructure monitoring and management server 234 includes stored anti-patterns, a process may execute within the networked computing environment to identify service models having CI configuration settings matching anti-patterns. When an anti-pattern is identified within a current configuration of the networked computing environment 200, a notice may be provided to an administrator. In some embodiments, when an anti-pattern is identified and the identified anti-pattern includes a pattern associated in metadata, the CI configuration settings of the pattern may be automatically implemented, such as through a provisioning application or process.

In some embodiments, upon detection of a performance metric violation by a process of the infrastructure monitoring and management server 234, the process may search the stored patterns, such as in the database 222, to identify a pattern that may be implemented to resolve the performance metric violation. When a pattern is identified, the pattern may be automatically implemented, such as through a provisioning application or process. In other embodiments, a message may be sent to an administrator including an identification of the performance metric violation and data representative of the identified pattern.

As discussed above, patterns and anti-patterns are identified and utilized with regard to CIs of service models. The CIs of a service model may represent elements of IT infrastructure technology such as routers, switches, data storage devices, servers, client computers, logical server programs and processes, and applications and processes that execute on server or client computers. Service models may be associated with metrics. The metrics evaluate parameters of the service model to obtain indicators of quality, availability, risk, and heath levels of an underlying system and identify constituent CIs that are affecting the service model. These metrics and indicators can be defined with Service Level Agreements or Objectives (SLA or SLO) and their associated operational level agreements.

Figure 5:
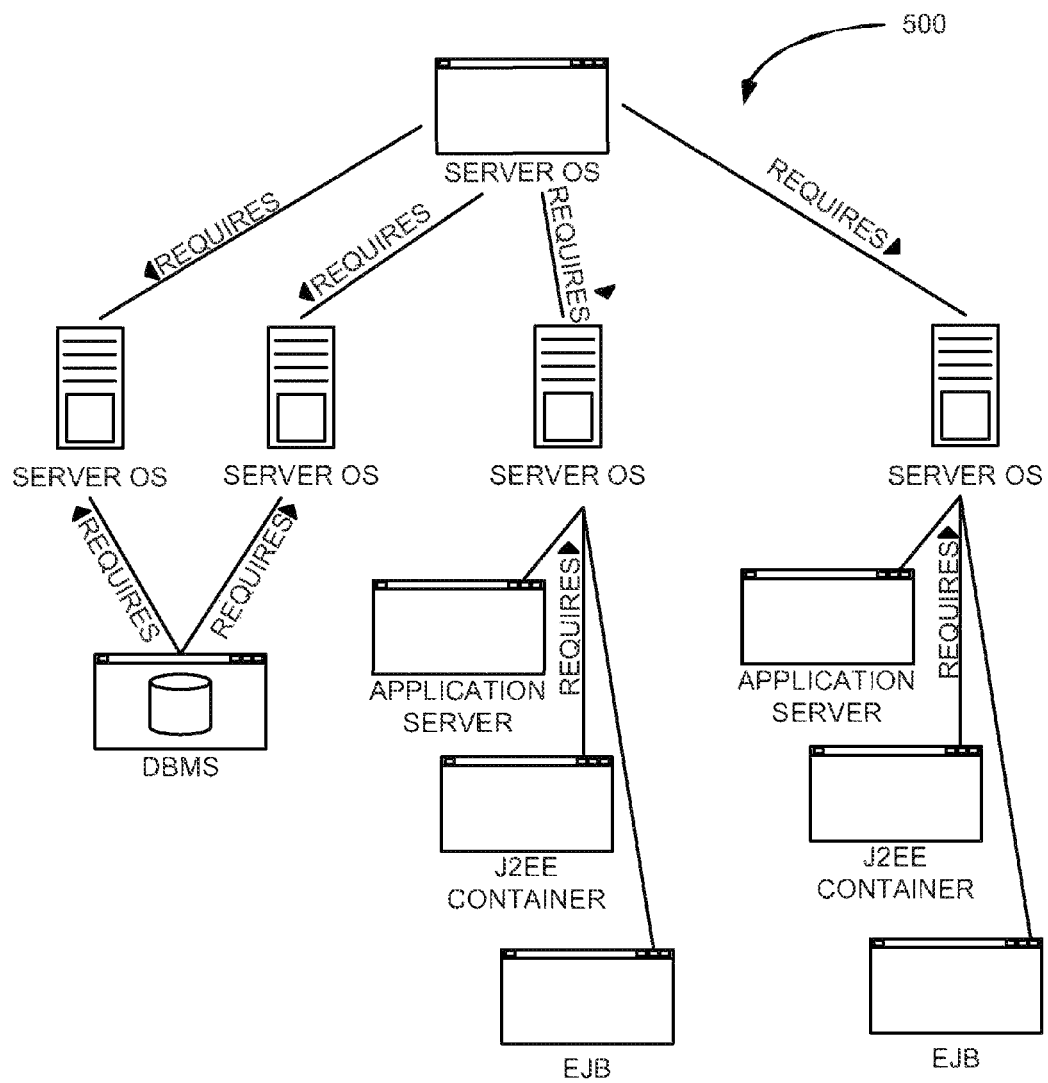
FIG. 5 illustrates a graphical representation of an abstracted service model according to an example embodiment.

A service model is an implementation of an abstract model, such as is illustrated in FIG. 5. The abstract model of FIG. 5 includes a graphical representation of abstracted CIs of the service model. FIG. 4 illustrates an abstraction of an example CI. FIG. 3 illustrates a CI from which the abstraction of FIG. 4 may be generated.

FIG. 3 illustrates a data structure 302 according to an example embodiment. The data structure 302 is an example of a CI. The data structure 302 includes an identifier (DATABASE SERVER DB3-#23), a name, a description, and other data. The other data includes "# of Licenses," a cost-per-license, and maintenance costs. The data of the CI data structure 302 may be modified as discussed above. Upon modification, a snapshot of the data is stored in a database along with a data when the data was changed. The snapshot may be used following the modification should a change in system performance be detected indicating a pattern or anti-pattern may be present in a system configuration. A snapshot of the data structure 302, along with other CIs of a service model, may also be taken upon detection that the CI of the data structure is associated with a service model that maintains or improves performance over time indicating a possible pattern or degrades performance of a service model over time indicating a possible anti-pattern.

When building a service model, to which performance metrics may be associated to measure performance of the service model, abstractions of service model CIs, such as the CI illustrated in FIG. 3, are made. FIG. 4 illustrated a data structure 402 according to an example embodiment. The data structure 402 is an example of an abstraction of the CI data structure 302 of FIG. 3. A service model is comprised of one or more abstracted configuration models and typically includes one or more associated performance metrics to measure and monitor performance thereof when implemented. A graphical representation of an example abstracted service model is illustrated in FIG. 5.

FIG. 5 illustrates a graphical representation of an abstracted service model 500 according to an example embodiment. The abstracted service model 500 includes a CI for each node of the service model and defines relationships there between. For example, a server operating system requires a server and database management systems, application servers, J2EE containers, and Enterprise Java Beans (EJBs) require a server having an operating system. Each node, such as the servers, server operating system, database management system (DBMS), and the like is an abstracted CI, such as is illustrated and described with regard to the CI data structure 402 of FIG. 4, although the configuration settings of each CI will vary between CI types. When implemented, each CI of the abstracted service model is associated with an IT resource of a computing environment, such as the networked computing environment 200 as illustrated and described with regard to FIG. 2. When a snapshot of the CIs is taken upon occurrence of a CI modification event, a detected improvement or degradation of performance with regard to the service model, or at another time, the CI configuration values of the relevant CIs are taken and stored in a database with a date of when the snapshot was taken. In some embodiments, a time of day when snapshot was taken is also included with the date.

When a candidate or actual pattern is detected, the abstracted service model is a template for generating the pattern data structure. The CI configuration settings for the pattern are populated into the pattern data structure, which is an instance of the abstracted service model. The pattern may then be augmented with additional data, such as metadata. The additional data may include a pattern name and classification that is descriptive and unique among patterns that help in identifying and referring to the pattern. The additional data may also include data describing the goal behind the pattern and the reason for using it, alternative names for the pattern, motivations for using the pattern such as use case descriptions, and contextual information describing a context within which the pattern may be useful. In some embodiments, the additional data may also include a graphical representation of the pattern, such as is illustrated in FIG. 5, and a listing of CIs, processes, services, and devices utilized in the pattern and descriptions of their respective roles. Some patterns might also include a description of results, side effects, and tradeoffs caused by using the pattern, a description of how to implement the pattern. The additional data in some of these embodiments may also include an instruction set for a provisioning application to automatically implement the pattern. Other additional data may be included in these and other embodiments.

Following instantiation of a pattern and population of the pattern with CI configuration settings and relevant additional data, the pattern is stored, such as in the database 222 of FIG. 2.

Pattern and Anti-Pattern Usage and Sharing

Stored pattern data structures representing patterns and anti-patterns are utilized for two distinct purposes. Patterns define known solutions that are likely to remediate successfully particular defined problems. Anti-patterns are defined problems that may exist in systems. Anti-patterns can therefore be used to evaluate a configuration of a system within which a service model of an anti-pattern is present. If the service model of an anti-pattern is present in a system, the anti-pattern is utilized to determine if there is a match, either exact or relative to some degree. If there is a match, a potential problem is identified. A problem may also be identified through application of performance metrics. In either case of problem identification, details of the identified problem may be used to automatically or manually query the stored patterns to identify potential solutions. The solutions may be identified through the additional data of the stored patterns as described above. An identified pattern may then be selected and implemented to resolve the identified problem. However, in some embodiments, metadata of an anti-pattern may include a reference to one or more patterns that will remediate the anti-pattern.

Figure 6:
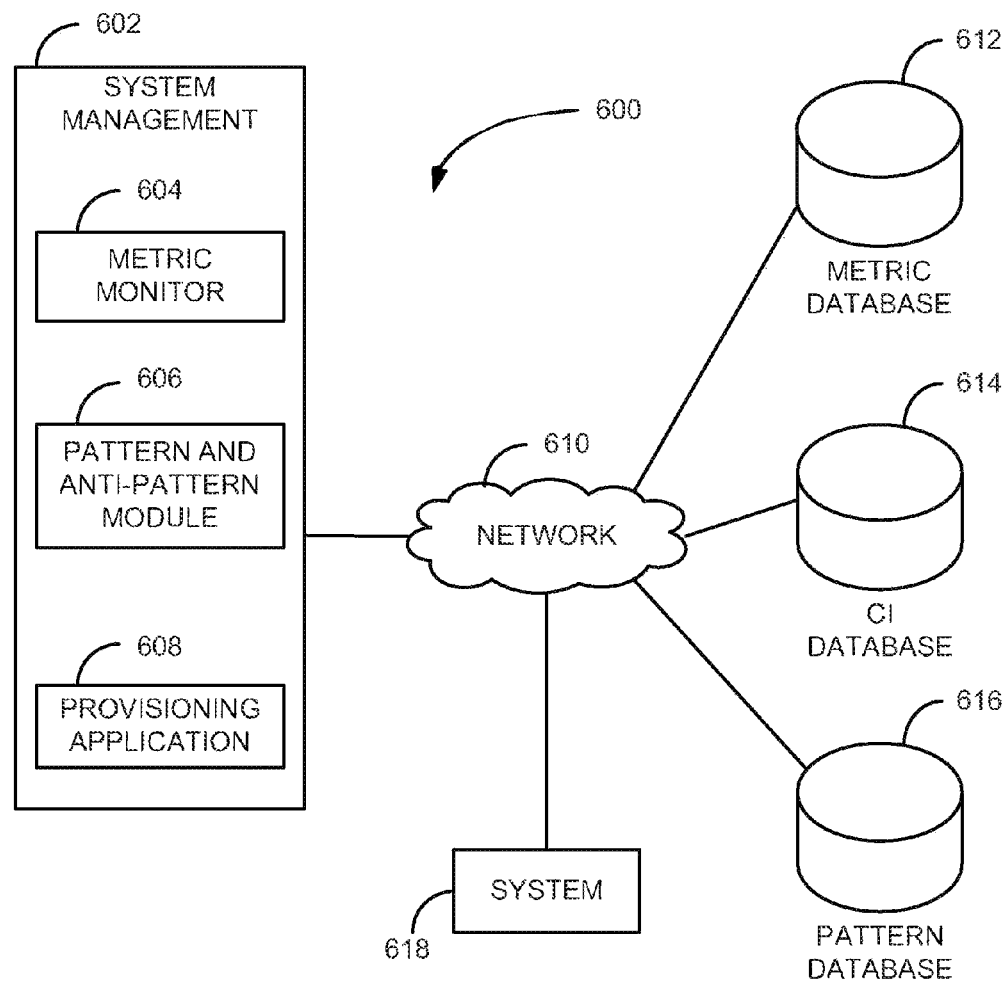
FIG. 6 is a logical block diagram of a system according to an example embodiment.

FIG. 6 is a logical block diagram of a system 600 according to an example embodiment. The system 600 is an example of a system within which pattern identification and usage is performed. The example system 600 includes a system under management 618, such as the networked computing environment 200 of FIG. 2 of a software system deployed therein.

The system 600 includes a system management application 602. The system management application 602 may include various modules to perform various tasks. For example, the system management application 602 may include a metric monitoring module 604, a pattern and anti-pattern module 606, and a provisioning application module 608. Although these modules 604, 606, 608 are illustrated and described with regard to a single system management application 602, the functionality of these modules 604, 606, 608 may be provided by individual applications, by more than one application, within the same module, or other arrangement.

The system management application 602 is connected to a network 610, such as one or more of a local area network, the Internet, or other network. Also connected to the network are the system under management 618, a metric database 612, a configuration item database 614, and a pattern database 616. Although the system under management 618 is illustrated as a single box, the system under management may be the networked computing environment 200 of FIG. 2, an instance of the service model 500 illustrated in FIG. 5, an enterprise application, or other application, computing environment, or set of computing resources.

The metric monitor module 604 executes to retrieve performance metrics from the metric database 612 over the network 610. The metric monitoring module 604 then applies the metrics to the system under management 618 to measure performance and identify metric violations. Results from applying the metrics are stored by the metric monitor module 604 to the metric database 612 with a time value indicating a date and time when the metric was applied to obtain each respective metric result value.

The metric monitoring module 604 may include a process that monitors metric results stored in the metric database 612 to identify trends of improving and decreasing performance. The metric monitoring module 604 also includes a process that identifies when performance metric violations, such as service level agreement violations, occur. Upon detection of decreasing performance or a metric violation, the process may query patterns stored in the pattern database 616 to identify patterns that may be relevant for resolving the metric violation or improving the decreasing performance of the system under management 618. Upon identification of a pattern to resolve the identified issue, the process of the metric monitoring module 604, in some embodiments, may submit a request to a service desk application requesting manual implementation of the identified pattern by an administrator. In other embodiments, upon identification of a pattern to resolve the identified issue, the process may submit a command to the provisioning application 608 requesting automated implementation of the identified pattern. The provisioning application 608 in such instances will then deploy the CI settings of the pattern to the system under management 618.

The metric monitor module 604, upon identification of a trend of improving and decreasing performance or a performance metric violation, may also send a communication to the pattern and anti-pattern module 606 to evaluate the identified trend or performance metric violation to determine if a new pattern has been identified. In some embodiments, the current configuration of the C is of the relevant service module may be evaluated in view of known patterns and anti-patterns stored in the pattern database 616. If a known pattern or anti-pattern is not identified, a process of the pattern and anti-pattern module 606 may evaluate metric values stored in the metric database 612 in view of CI configurations settings store in the CI database 614 to define a potential pattern.

Upon detection and definition of a pattern or anti-pattern, the pattern and anti-pattern module 606 may send a copy of the pattern or anti-pattern over the network to a pattern sharing service (not illustrated). The pattern sharing service may be a service hosted by an industry consortium, a software development company, or other entity for sharing knowledge through identified patterns and anti-patterns. When a pattern or anti-pattern is sent to the pattern sharing service, a process may execute upon the received pattern to identify similarities with other patterns previously received by the service. Duplicate patterns are discarded. The pattern sharing service then makes the remaining patterns and anti-patterns available. In some instances, the patterns and anti-patterns may be pushed to or periodically downloaded to the pattern database 616 of constituents of the pattern sharing service.

Figure 7:
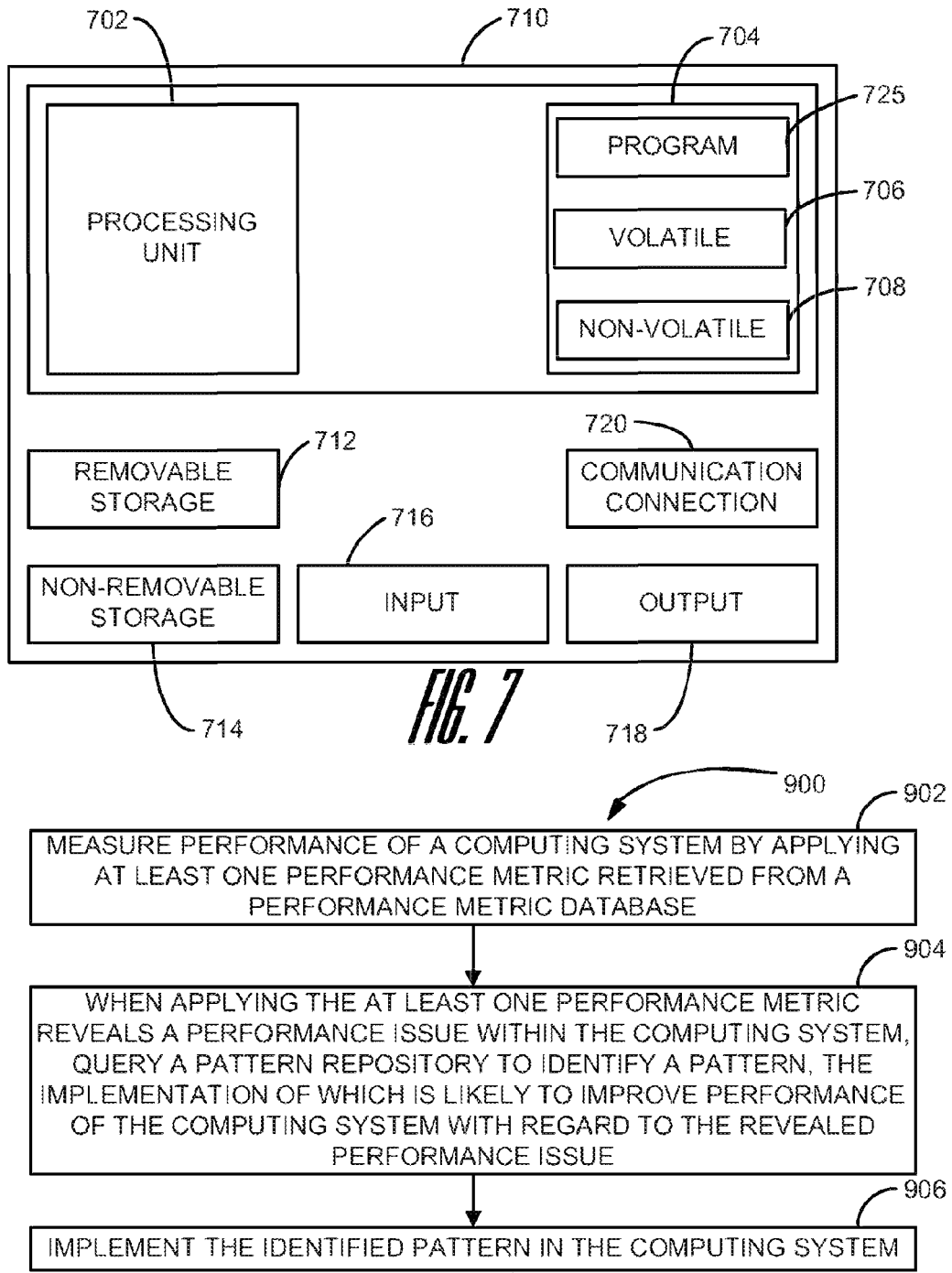
FIG. 7 is a block diagram of a computing device according to an example embodiment.

FIG. 7 is a block diagram of a computing device according to an example embodiment. In one embodiment, multiple such computer systems are utilized in a distributed network to implement multiple components in a transactionbased environment. An object-oriented, service-oriented, or other architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable storage medium are executable by the processing unit 702 of the computer 710. A hard drive, CD-ROM, and RAM are some examples of articles including a computer-readable storage medium. For example, a computer program 725 capable performing one or more of the method described herein. Further, the computer program 725 may be the system management application 602 program illustrated and described with regard to FIG. 6.

Method Embodiments

Figure 8:
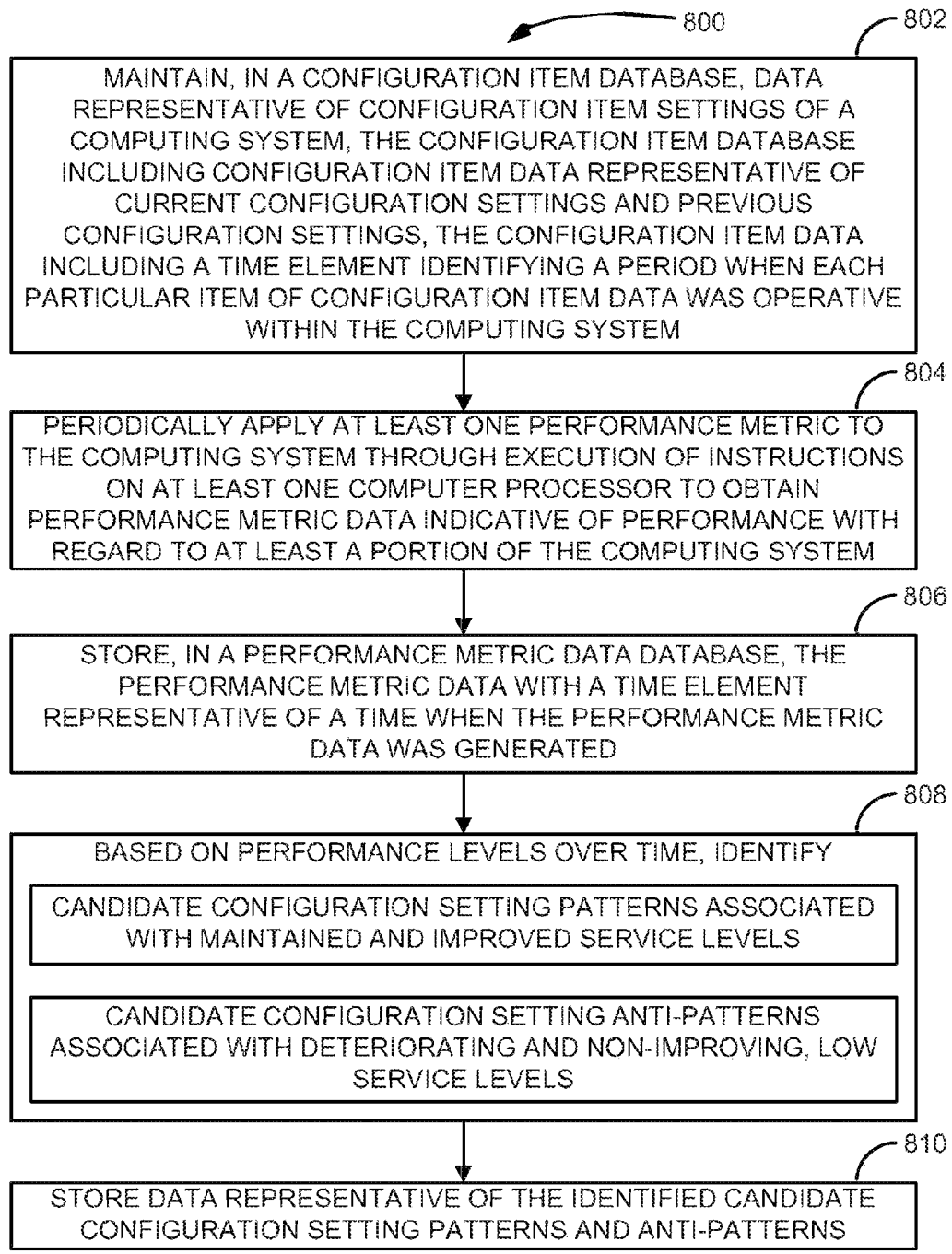
FIG. 8 is a flow diagram of a method according to an example embodiment.
Figure 10:
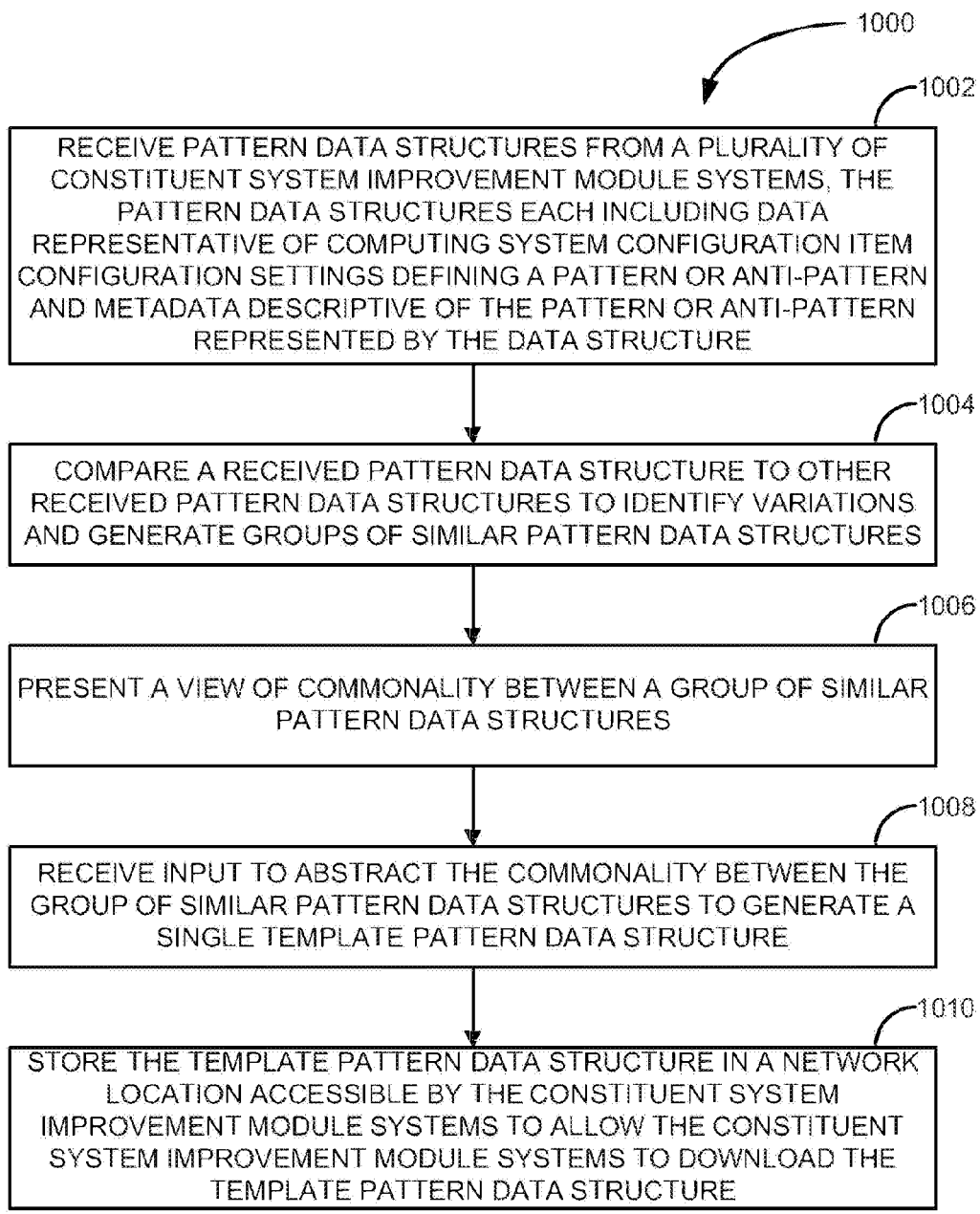
FIG. 10 is a flow diagram of a method according to an example embodiment.

FIG. 8, FIG. 9, and FIG. 10 provide examples of methods according to some example embodiments. FIG. 8 is an example of a method that may be performed to identify patterns and anti-patterns within a system. FIG. 9 is an example of a method that may be performed to utilize patterns to improve system performance. FIG. 10 is an example of a method that may be performed to share patterns and anti-patterns.

FIG. 8 is a flow diagram of a method 800 according to an example embodiment. As stated above, FIG. 8 is an example of a method that may be performed to identify patterns and anti-patterns within a system. The method 800 includes maintaining 802, in a configuration item database stored on a data storage device, data representative of configuration item settings of a computing system. The configuration item database may include configuration item data representative of current configuration settings and previous configuration settings. The configuration item data typically includes a time element identifying a period when each particular item of configuration item data was operative within the computing system.

The method 800 further includes periodically applying 804 at least one performance metric to the computing system through execution of instructions on at least one computer processor to obtain performance metric data indicative of performance with regard to at least a portion of the computing system. In various embodiments, the performance metrics may be retrieved from a database or other storage repository or the performance metrics may be hardcoded into a computer program performing the method 800. The periodic basis at which a particular performance metric is applied 804 may be set by a configuration setting. The periodic basis may be hourly, daily, weekly, monthly, or other period depending on the embodiment and the configuration.

Within the method 800, the performance metric data is also stored 806, in a performance metric data database. The performance metric data is typically stored with a time element representative of a time when the performance metric data was generated.

Additionally, the method 800, based on performance levels over time, includes identifying 808 candidate configuration setting patterns associated with maintained and improved service levels. The identifying 808 of method 800 also includes identifying 808 candidate configuration setting anti-patterns associated with deteriorating and non-improving, low service levels. The method 800 may then store 810 data representative of the identified candidate configuration setting patterns and anti-patterns.

In some embodiments, identifying 808 the candidate configuration setting patterns and anti-patterns includes periodically executing at least one report against the performance metric database. The at least one report is executed to identify a change in a service quality level as a function of the stored performance metric data of a current configuration and at least one previous configuration. When the at least one report reveals a change in the service quality level, some embodiments of the method include identifying configuration item differences between the current configuration and the at least one previous configuration of the at least a portion of the computing system. The current configuration of the configuration items for which differences were identified form a portion of the candidate configuration setting pattern or anti-pattern.

In some other embodiments, identifying 808 the candidate configuration setting patterns and anti-patterns includes identifying a performance level change over time by comparing performance metric data of a particular performance metric. Typically, the performance level change is identified between a current configuration and a previous configuration. The method 800 in such embodiments further includes comparing configuration item settings of the current configuration and the previous configuration to identify configuration item configuration setting differences. The identified configuration item setting differences, in such embodiments may form at least a portion of a candidate configuration setting pattern or anti-pattern.

Some such embodiments include presenting a view of an identified candidate pattern or anti-pattern to allow an administrator to review the candidate. The view may also allow the administrator to confirm or reject the candidate pattern or anti-pattern. Some embodiments may also allow the administrator to add metadata to the candidate as described above. Following receipt of confirmation from the administrator, such embodiments of the method 800 include generating a pattern data structure including the pattern or anti-pattern and storing the pattern data structure in a pattern repository on a data storage device.

FIG. 9 is a flow diagram of a method 900 according to an example embodiment. As stated above, FIG. 9 is an example of a method 900 that may be performed to utilize patterns to improve system performance. The method 900 includes measuring performance of a computing system by applying 902 at least one performance metric retrieved from a performance metric database. When applying 902 the at least one performance metric reveals a performance issue within the computing system, the method 900 includes querying 904 a pattern repository to identify a pattern. Implementation of the identified pattern is likely to improve performance of the computing system with regard to the revealed performance issue. Thus, the method 900 also includes implementing 906 the identified pattern in the computing system.

The performance metric database, in some embodiments, stores performance metrics that are executable to measure performance of the computing system. The metrics operate based on performance related data obtained from processes of the computing system and devices upon which the computing system operates, such as through SNMP messaging. In some embodiments, the method 900 further includes measuring performance of the computing system subsequent to implementing 906 the identified pattern to confirm the implemented pattern resolved the intended performance issue and did not create new one. The performance measurement may be performed according to a metric identified in the data of the implemented 906 pattern, metrics relevant to a modified service model, or other metrics.

FIG. 10 is a flow diagram of a method 1000 according to an example embodiment. As stated above, FIG. 10 is an example of a method 1000 that may be performed to share patterns and anti-patterns. The method 1000 is typically performed at least in part on a server that operates on a network, such as the Internet, to receive patterns from constituent systems and organization and make the patterns available to other constituents.

The method 1000 includes receiving 1002 pattern data structures from a plurality of constituent system improvement module systems. The system improvement modules may include a module such as the pattern and anti-pattern module 606 illustrated and described with regard to FIG. 6. The pattern data structures of the method 1000 may each include data representative of computing system configuration item configuration settings defining a pattern or anti-pattern and metadata descriptive of the pattern or anti-pattern represented by the data structure.

The method 1000 also includes comparing 1004 a received pattern data structure to other received pattern data structures to identify variations and generate groups of similar pattern data structures. The method 1000 may then present 1006 a view, to a user, of commonality between a group of similar pattern data structures and receive 1008 input, from the user, to abstract the commonality between the group of similar pattern data structures to generate a single template pattern data structure. The method 1000 may then store 1010 the template pattern data structure in a network location accessible by the constituent system improvement module systems to allow the constituent system improvement module systems to download the template pattern data structure.

In some embodiments, presenting 1006 the view of the commonality includes presenting, in a user interface, a representation of configuration item configuration settings that are identical within the group of similar pattern data structures and configuration item configuration settings that appear in less than the entire group of similar pattern data structures. The user interface in such embodiments is capable of receive selection input of configuration item configuration settings that appear in less than all of the group of similar pattern data structures to include in the single template data structure. The user interface is also capable of receiving input to initiate a process to generate the single template data structure.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    storing, in a pattern repository, pattern data structures each including data representative of computing system configuration item (CI) configuration settings defining a pattern or anti-pattern, the data representative of a pattern defining a known solution to a defined problem and the data representative of an anti-pattern defining an unsuccessful solution to a defined problem, wherein the pattern data structures further include metadata descriptive of the pattern or anti-pattern represented by the pattern data structure, and wherein the metadata descriptive of each anti-pattern includes a reference to one or more patterns that remediate the anti-pattern;
    measuring performance of a computer system based, at least in part, on performance metrics that are used to evaluate parameters of a service model to obtain indicators of quality, availability, risk, and heath levels of the computer system and identify constituent CIs that are affecting the service model;
    determining that the computer system is experiencing a performance issue based, at least in part, on measuring the performance;
    in response to determining that the computer system is experiencing the performance issue, matching the performance metric with an anti-pattern to identify a performance issue, wherein the anti-pattern defines an incorrect solution to a defined problem occurring in the computer system; and
    querying the pattern repository to identify a pattern that defines a solution to the defined problem based, at least in part, on the match between the performance metric and the anti-pattern; and
    in response to identifying the pattern, implementing the pattern in the computer system to improve the performance.

2. The method of claim 1, wherein measuring the performance comprises recording a time element when the performance was measured, wherein matching the performance metric with the anti-pattern is based, at least in part, on the time element.

3. The method of claim 1, wherein implementing the pattern comprises applying configuration settings derived from the pattern to configurable elements in the computer system.

4. The method of claim 1, wherein the anti-pattern is associated with a deteriorating and non-improving performance in the computer system.

5. The method of claim 1, wherein the pattern and the anti-pattern are defined by configuration settings of configuration items in the computer system.

6. The method of claim 1, wherein the pattern is defined by configuration settings which resulted in a positive change in a value of the performance metric.

7. The method of claim 1, wherein the anti-pattern is defined by configuration settings which resulted in a negative change in a value of the performance metric.

8. The method of claim 1, wherein the performance metric comprises at least one of a response time of a hardware device or a process, latency in a process response, availability of a hardware device or process, and an available storage capacity of a data storage device.

9. An apparatus comprising:
    a processor; and
    a machine-readable medium having program code executable by the processor to cause the apparatus to:
    store, in a pattern repository, pattern data structures each including data representative of computing system configuration item (CI) configuration settings defining a pattern or anti-pattern, the data representative of a pattern defining a known solution to a defined problem and the data representative of an anti-pattern defining an unsuccessful solution to a defined problem, wherein the pattern data structures further include metadata descriptive of the pattern or anti-pattern represented by the pattern data structure, and wherein the metadata descriptive of each anti-pattern includes a reference to one or more patterns that remediate the anti-pattern;
    measure performance of a computer system based, at least in part, on performance metrics that are used to evaluate parameters of a service model to obtain indicators of quality, availability, risk, and heath levels of the computer system and identify constituent CIs that are affecting the service model;

determine that the computer system is experiencing a performance issue based, at least in part, on the performance;

in response to a determination that the computer system is experiencing the performance issue, match the performance metric with an anti-pattern to identify a performance issue, wherein the anti-pattern defines an incorrect solution to a defined problem occurring in the computer system; and query the pattern repository to identify a pattern that defines a solution to the defined problem based, at least in part, on the match between the performance metric and the anti-pattern; and in response to an identification of the pattern, implement the pattern in the computer system to improve the performance.

10. The apparatus of claim 9, wherein the program code executable by the apparatus to measure the performance comprises program code executable by the apparatus to record a time element when the performance was measured, wherein the program code executable by the apparatus to match the performance metric with the anti-pattern is based, at least in part, on the time element.

11. The apparatus of claim 9, wherein the program code executable by the apparatus to implement the pattern comprises program code executable by the apparatus to apply configuration settings derived from the pattern to configurable elements in the computer system.

12. The apparatus of claim 9, wherein the anti-pattern is associated with a deteriorating and non-improving performance in the computer system.

13. The apparatus of claim 9, wherein the pattern and the anti-pattern are defined by configuration settings of configuration items in the computer system.

14. The apparatus of claim 9, wherein the pattern is defined by configuration settings which resulted in a positive change in a value of the performance metric.

15. The apparatus of claim 9, wherein the anti-pattern is defined by configuration settings which resulted in a negative change in a value of the performance metric.

16. The apparatus of claim 9, wherein the performance metric comprises at least one of a response time of a hardware device or a process, latency in a process response, availability of a hardware device or process, and an available storage capacity of a data storage device.

17. One or more non-transitory machine-readable storage media having program code stored therein, the program code comprising instructions to:

store, in a pattern repository, pattern data structures each including data representative of computing system configuration item (CI) configuration settings defining a pattern or anti-pattern, the data representative of a pattern defining a known solution to a defined problem and the data representative of an anti-pattern defining an unsuccessful solution to a defined problem, wherein the pattern data structures further include metadata descriptive of the pattern or anti-pattern represented by the pattern data structure, and wherein the metadata descriptive of each anti-pattern includes a reference to one or more patterns that remediate the anti-pattern;

measure performance of a computer system based, at least in part, on performance metrics that are used to evaluate parameters of a service model to obtain indicators of quality, availability, risk, and heath levels of the computer system and identify constituent CIs that are affecting the service model, wherein the program code comprising instructions to measure the performance comprises program code comprising instructions to record a time element when the performance was measured;

determine that the computer system is experiencing a performance issue based, at least in part, on measuring the performance;

in response to a determination that the computer system is experiencing the performance issue, match the performance metric with an anti-pattern based, at least in part, on the time element to identify a performance issue, wherein the anti-pattern defines an incorrect solution to a defined problem occurring in the computer system; and query the pattern repository to identify a pattern that defines a solution to the defined problem based, at least in part, on the match between the performance metric and the anti-pattern; and in response to an identification of the pattern, implement the pattern in the computer system to improve the performance.

18. The one or more machine-readable storage media of claim 17, wherein the program code comprising instructions to implement the pattern comprises program code comprising instructions to apply configuration settings derived from the pattern to configurable elements in the computer system.

19. The one or more machine-readable storage media of claim 17, wherein the pattern is defined by configuration settings which resulted in a positive change in a value of the performance metric, and wherein the anti-pattern is defined by configuration settings which resulted in a negative change in a value of the performance metric.

20. The one or more machine-readable storage media of claim 17, wherein the performance metric comprises at least one of a response time of a hardware device or a process, latency in a process response, availability of a hardware device or process, and an available storage capacity of a data storage device.

* * * * *